April 9, 1963 L. R. BROWN 3,085,226

CHARACTER SELECTION DEVICE

Filed March 11, 1960

INVENTOR.

Laurence R. Brown

United States Patent Office 3,085,226
Patented Apr. 9, 1963

3,085,226

CHARACTER SELECTION DEVICE

Laurence R. Brown, Berwyn, Pa., assignor, by mesne assignments, to Drexel Dynamics Corporation, Philadelphia, Pa., a corporation of Pennsylvania Filed Mar. 11, 1960, Ser. No. 14,214
6 Claims. (Cl. 340—146.3)

Figure 1:
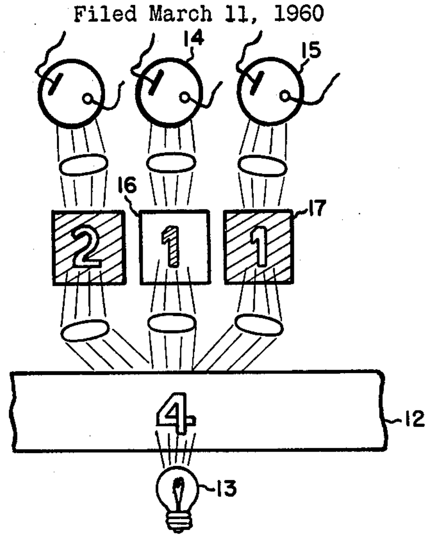

This invention relates to electronic selection circuits and more particularly it relates to photoresponsive character detection devices.

In detection methods for recognizing characters or reading printed text, it is difficult to use standard alphabets or number styles because of similarities in detector response to different characters. For example, in a map comparison technique of detection, the figure eight may compare favorably with a map identifying the figure three.

It is desirable to use map comparison techniques however in recognizing characters, since detection of an entire character may be made at once without scanning. Simple data processing equipment may be employed with static, asynchronous detection not dependent upon timing, relative character positioning, speed of presentation or complex logical decision. These advantages are disclosed in my copending application for Character Distinction Means, S.N. 3,859, filed January 21, 1960. This relates to a system for permitting asynchronous identification of an unknown pattern presented for recognition by comparison with two reference maps complementary in nature. Such comparisons are made with photo sensitive devices sensing the match between a map and character to be identified.

In connection with this comparison technique, it is desirable to provide decisions indicating the selected character at as early a signal level as possible to permit definite go-no go action thereafter. Accordingly increased sensitivity of the detection circuit is desired, and a decision consistent with overall simplicity of data processing circuits following the detector. Furthermore, in detecting signals at discrete threshold levels, circuit stability must be provided to prevent changing conditions from affecting decisions. Certain variations as temperature, signal contrast and tube aging may tend to restrict the range of acceptable signals in detection circuits. Limitations in effectiveness of sensitive photo resistive devices which operate at high impedance levels are often imposed by reason of noise, poor time constant response due to stray capacities as well as poor environmental matching with low impedance circuits such as transistor amplifiers.

Thus an objective of the present invention is to provide means providing improvements of the nature hereinbefore discussed.

It is an object of the present invention to provide improved detection means for use in character recognition systems.

A more general object of the invention is to provide improved electronic selection circuits.

Figure 2:
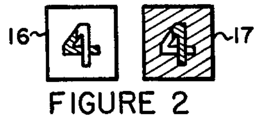
Figure 3:
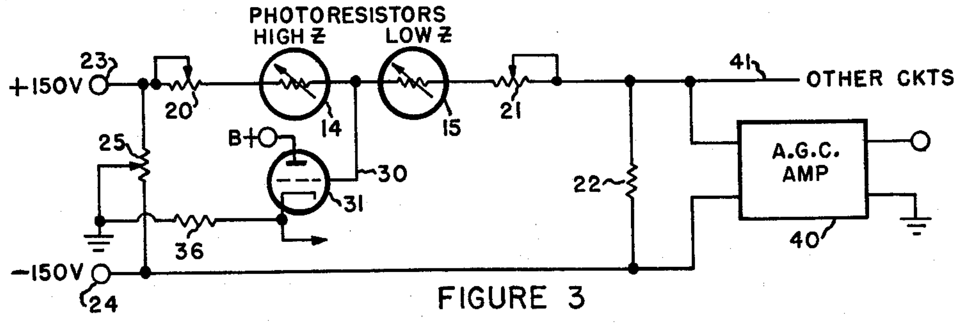
Figure 4:
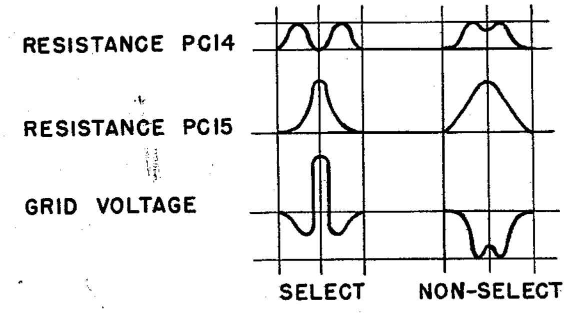

In accordance with the invention a special photo sensitive detection circuit is disclosed for providing a decision indicating the presence of a particular sensed character of a set of characters. The detector circuit comprises essentially a cathode follower stage responsive to differential input signals from a pair of photo sensitive devices operating from voltage sources of different polarity. Each photosensitive device views one of two patterns used in identifying the character. The mode of operation is discussed in detail with reference to the drawing, wherein:

FIGURE 1 depicts a dual pattern selection technique useful with the present invention, FIGURE 2 is a sketch illustrating the method by which this invention distinguishes between typical patterns, FIGURE 3 is a schematic circuit diagram of an embodiment of the invention, and FIGURE 4 is a waveform chart illustrating the mode of operation of the detection circuit afforded by the invention.

Referring now to FIGURE 1, the document 12 carries an unknown pattern (4) to be recognized at the reading station between lamp 13 and photocells 14, 15, etc., by comparison with a set of maps 16, 17, etc., displaying unique patterns. An appropriate optical lens system serves to simultaneously register the unknown character pattern upon each of the maps 16, 17, etc. to determine the degree of match.

Consider the exemplary characters shown by referring to FIGURE 2. If the unknown character four is registered with the negative map 17 displaying character one, it is seen that a complete null would occur upon photocell 15 just as if the character one were in registration.

To avoid the necessity for providing special type fonts to distinguish these characters, two patterns such as positive and negative maps 16, 17 are provided. As seen on the positive map 16, the unknown character four will tend to obscure part of the field outside of the map pattern one, and therefore, will cause a tendency for photocell 14 to null at some value less than at full registration with a character one.

As shown in FIGURE 3, the photo sensitive transducers 14, 15 may be photoresistive devices. These together with proportioning resistors 20, 21 and sensing resistor 22 form a voltage divider network across a voltage source indicated at terminals 23 and 24. A bias level can be set at variable resistor 25 to permit a choice of the desired operating level of the grid 30 of cathode follower 31.

In operation the resistance of the photocells and accordingly the grid circuit voltage varies as shown by the waveforms of FIGURE 4 during the time period that a character is moved across the viewing field. The two photocells are coupled to driving potential of different polarity at terminals 23 and 24 so that their action may be expressed as differential when viewing action at grid lead 30.

In the embodiment shown, photoresistor 14 is at a low resistance value and photoresistor 15 is at a high resistance value near select condition. For this reason respectively high and low impedance transducers are used rather than similar ones, as hereinafter discussed. This affords more convenient voltage levels for proportioning response and also permits better correction of temperature response changes at the grid 30 at the selection condition. The resistive network is of basic high impedance to meet the requirements of the grid circuit 30 for tube 31.

Operation may be explained in terms of voltage division. Thus as resistance of photoresistor 14 becomes lower in response to signal input, the grid 30 tends to become more positive with respect to the voltage reference position at ground, as conversely happens when the resistance of photoresistor 15 becomes higher. Accordingly, the decision is made under select conditions of FIGURE 4 as both resistance conditions operate to drive the tube 31 into full conduction.

Go-no go operation is provided if the bias resistor 25 is set to hold the tube 31 near cut-off in the absence of any characters so that the conduction level must be reached to obtain a decision by operating the tube 31. The proportioning resistors 20, 21 can be used to adjust the relative weights given to the photoresistors 14 and 15 in causing conduction (or preventing conduction) at grid 30. Thus each transducer contributes at its preferred level of operating sensitivity to a decision encountered by driving tube 31 into conduction.

Because the extreme range of gains obtainable by using standard photocells such as Clairex type 7 material for photoresistor 14 and Clairex type 4 material for photoresistor 15, the detection sensitivity of this circuit is high. These materials are chosen to provide substantially equal resistance values near the decision level at a value desirable for operating the grid 30 with good frequency response and sensitivity. Also, the impedance level at cathode load resistor 36 is low enough to afford good matching with output relay or transistor operated circuits.

In addition to self induced signal compensation effects caused by tendency of both photoresistors to have decreased resistance with a lower contrast unselected input character, automatic gain control may be made available for producing more tolerance to changes of contrast during selection conditions. Thus sensing resistor 22 is employed together with AGC amplifier 40. All the circuits for other character decisions (nine in number, when identifying decimal digits) are also coupled to the power supply terminals 23, and 24 by way of the sensing resistor 22 and lead 41. This causes a current flow proportional to the average contrast of all photoresistors at selection, which in essence is generation of a dynamic signal level voltage.

By amplification of this voltage in circuit 40, an AGC signal is produced which may be used for increasing the operable range of the detection circuit. Thus as contrast changes the selection level is varied to compensate for signal level differences.

In the illustrated embodiment, photoresistor 15 can be looked upon as the primary decision maker with power of veto given to photoresistor 14. This occurs when the tube 31 is operated at cut-off in static condition since a change of resistance of photoresistor 14 can only serve to drive the tube further into cutoff. This is seen from consideration of image pattern 16 of FIGURE 1 and the waveforms of FIGURE 4.

The disclosed circuit embodiment affords high sensitivity and reliable performance under varying conditions of signal, loading and environment variation. This results from the novel combination of elements employed in this photo detection principle, as described with particularity in the following claims.

I claim:

1. In a character recognition system for recognizing individual ones of a group of characters of selected configurations; a group of positive pattern areas each transparent except for an opaque pattern of a different one of said characters; a group of negative pattern areas each opaque except for a transparent pattern of a different one of said characters; a message-bearing medium having thereon characters to be recognized, said characters having substantially different light transmissive properties than the remainder of said medium; a reading station; a light source; a first lens system comprising a different lens area for each pattern area of each the positive and negative groups; said light source, reading station, message-bearing medium, first lens system, and said positive and negative pattern groups being so positioned that light rays from said source pass through said message-bearing medium at said reading station and are focused by said first lens system as an image on each of the pattern areas of both said positive and negative pattern groups, said image being in the same phase on both the positive and negative pattern groups; a second lens system comprising a different lens area for each pattern area of each the positive and negative groups; a plurality of pairs of photo-conductive devices the resistance of which varies as a function of the light impressed thereon for developing electrical sigals correpsonding to light information received, there being a different pair of such devices for each different character in the group, said second lens system and said pairs of photo-conductive devices being so positioned that light rays passing through each different pattern area of both said positive and negative pattern groups are focused on a different one of said photo-conductive devices with the light rays which pass through the negative and positive pattern areas of a particular character being focused separately on one and the other device respectively of a pair of photo-conductive devices; means connecting each pair of photo-conductive devices in series across a source of D.-C. voltage; electronic switching means having input elements and having conductive and non-conductive states as determined by the voltage applied across its input elements; means connecting said one of the photo-conductive devices of a series pair across said input elements, said switching means being normally so biased that said switching means remains in the same one state and is adapted to be changed to its other state only in response to such a change in voltage across its input terminals as results when the resistances of both of said photo-conductive devices of the series pair change concurrently in such directions and to such extents that the resistance of one of the devices of the pair reaches a maximum operating value and the resistance of the other device of the pair reaches a minimum operating value; and means for deriving a character-recognition output signal from said electronic switching device when it changes to its other state.

2. Apparatus as claimed in claim 1 characterized in that said one photo-conductive device of the series pair which is connected across the input terminals of the switching means is the photo-conductive device which is connected in the lower voltage series position.

3. Apparatus as claimed in claim 2 further characterized in that said electronic switching device is an electronic tube having anode, cathode and grid elements and a cathode resistor in its anode-cathode circuit, means connecting the grid to the common junction of the series connected photo-conductive device, and means connecting the other end of the cathode resistor to the low-voltage terminal of the D.C. voltage source.

4. In a character recognition system for recognizing individual characters of different but similar configurations; a positive pattern area for each such character transparent except for an opaque pattern of said character; a negative pattern area for each such character opaque except for a transparent pattern of said character; a light-transparent message-bearing medium having thereon opaque characters to be recognized; a reading station; a light source; a first lens system comprising a different lens for each positive and negative pattern area, said light source, reading station, message-bearing medium, first lens system, and positive and negative pattern areas being so positioned that light rays from said source pass through said message-bearing medium at said reading station and are focused by said first lens system as an image on each of both said positive and negative pattern areas, said image being in the same phase on both said positive and negative pattern areas for passing, in the event of coincidence between the character being read and the pattern, minimum light and maximum light at the negative and positive patterns, respectively; a second lens system comprising a different lens for each the positive and negative pattern areas; a pair of photo-conductive devices associated respectively with the positive and negative pattern areas for developing electrical signals corresponding to light information received, said second lens system and said photo-conductive devices being so positioned that light rays passing through said negative and positive pattern areas are focused on one and the other respectively of said pair of photo-conductive devices; means connecting the pair of photo-conductive devices in series across a source of D.-C. voltage; electronic switching means having input elements and having conductive and non-conductive states as determined by the voltage applied across its input elements; means connecting said input elements across one of the photo-conductive devices of the series pair, said switching means being normally so biased that said switching means remains in the same one state and is adapted to be changed to its other state only in response to such a change in voltage across its input terminals as results when the resistances of both of said photo-conductive devices of the series pair change concurrently in such directions and to such extents that the resistance of one of the devices of the pair reaches a maximum operating value and the resistance of the other device of the pair reaches a minimum operating value; and means for deriving a character-recognition output signal from said electronic switching device when it changes to its other state.

5. Apparatus as claimed in claim 4 characterized in that said one photo-conductive device of the series pair which is connected across the input terminals of the switching means is the photo-conductive device which is connected in the lower voltage series position.

6. Apparatus as claimed in claim 5 further characterized in that said electronic switching device is an electronic tube having anode, cathode and grid elements and a cathode resistor in its anode-cathode circuit, means connecting the grid to the common junction of the series connected photo-conductive device, and means connecting the other end of the cathode resistor to the low-voltage terminal of the D.-C. voltage source.

References Cited in the file of this patent

UNITED STATES PATENTS

| | | |
|---|---|---|
| 2,065,758 | Shepard | Dec. 29, 1936 |
| 2,125,073 | Knowles | July 26, 1938 |
| 2,140,355 | Gulliksen | Dec. 13, 1938 |
| 2,241,557 | Nichols | May 13, 1941 |
| 2,404,131 | Gieseke | July 16, 1946 |
| 2,594,514 | Sweet | Apr. 29, 1952 |
| 2,711,728 | Bailey | June 28, 1955 |
| 2,919,425 | Ress | Dec. 29, 1959 |
| 2,924,812 | Merritt et al. | Feb. 9, 1960 |
| 2,933,246 | Rabinow | Apr. 19, 1960 |